United States Patent [19]

Shy

[11] 4,238,100
[45] Dec. 9, 1980

[54] FIXED DEVICE OF FOLDING LEG

[76] Inventor: Min C. Shy, 20, Alley 18, Lane 109, Hoping St., Yang Ho City, Taipei, Taiwan

[21] Appl. No.: 47,608

[22] Filed: Jun. 11, 1979

[51] Int. Cl.³ .................... F16M 11/32; F16M 11/38
[52] U.S. Cl. .................................. 248/439; 108/132; 126/304 R; 248/188.6; 292/115
[58] Field of Search ............... 108/115, 132, 131, 130; 248/188, 188.6, 439, 150, 168; 126/304 R, 304 A, 9 R, 30, 38, 275 R; 292/256.75, 285, 115

[56] References Cited

U.S. PATENT DOCUMENTS

| | | | |
|---|---|---|---|
| 581,589 | 4/1897 | Houghton | 108/132 |
| 1,133,109 | 3/1915 | Derbyshire | 108/132 |
| 1,223,065 | 4/1917 | Meyer | 248/439 |
| 1,537,712 | 5/1925 | Specht | 292/115 X |
| 2,523,760 | 9/1950 | Hayner | 292/256.75 |
| 3,307,866 | 3/1967 | Barlow | 292/115 X |
| 4,063,703 | 12/1977 | Shy | 248/439 |
| 4,131,261 | 12/1978 | Shy | 108/132 |

*Primary Examiner*—James T. McCall
*Attorney, Agent, or Firm*—Karl W. Flocks

[57] ABSTRACT

The present invention provides a fixed device of folding leg in which a U-shaped frame of a folding means may be sturdily pressed and fixed by means of a fixed device which may also substantially integrate a roaster oven with the supporting legs thereof to stabilize said oven when the supporting legs are at a standing position.

3 Claims, 6 Drawing Figures

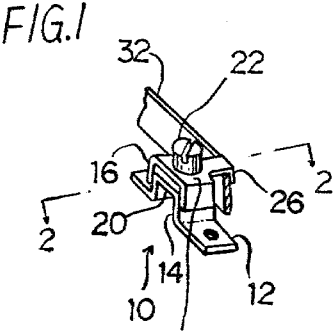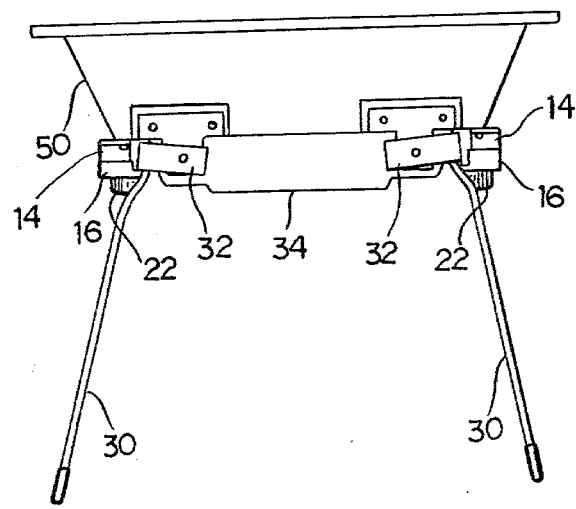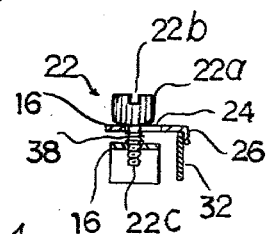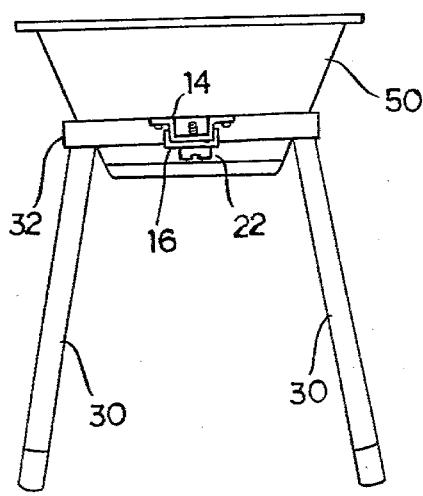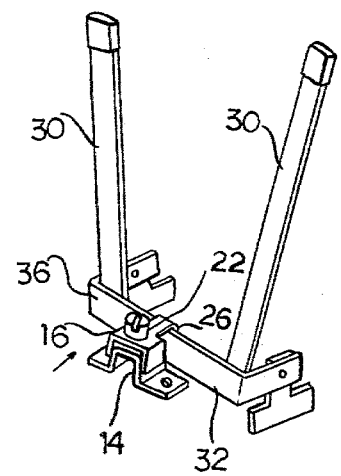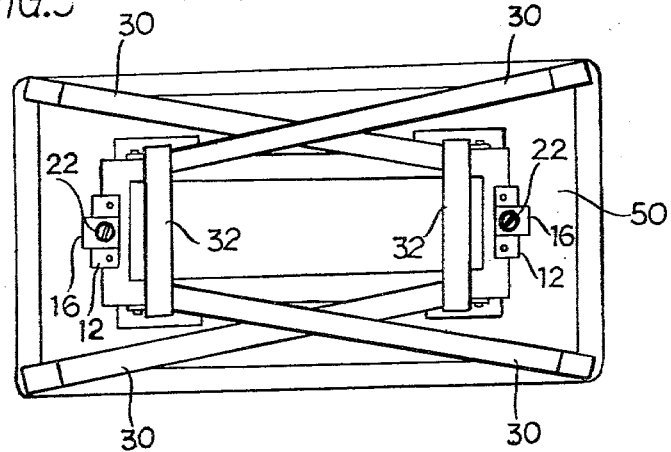

FIXED DEVICE OF FOLDING LEG

BACKGROUND OF THE INVENTION

The present invention relates to a fixed device of folding leg, more particularly, to a fixed device, equipped on a roaster oven, by which the supporting legs of roaster oven may be stabilized and fixed upright.

The purpose of the present invention is mainly is an improvement over of patents of U.S. Pat. Nos. 4,063,703 and 4,131,261, which had been applied by the inventor of this invention and approved, and to disclose a fixed device of folding leg having a novel simple construction and convenient for users to stand upright the supporting legs of roaster oven.

In accordance with the above mentioned patents of U.S. Pat. Nos. 4,063,703 and 4,131,261, whenever standing, the two U-shaped frames of the folding means have to be parallelly pressed into the bottom of roaster oven body. Morever, it has to adjust the front end of the fixing screw, which is set on the intermediate portion of the U-shaped frame, to engage with the screw hole provided on the bottom of roaster oven body, and then by rotating the screw into the screw hole and combining integratedly the U-shaped frame with the roaster oven body. Therefore, it certainly includes a number of operational difficulties in that the fixing screw is not adjustable to effect proper engagement with the screw hole or is not easily adjusted to the hole for engagement while operating.

SUMMARY OF THE INVENTION

According to the improvements of the present invention, a latch mechanism for stabilizing a foldable leg assembly comprises a U-shaped fixing base having a double base, a U-shaped fixing plate which is able to properly engage with the above said U-shaped fixing base and to arbitrarily slip back and forth, and an adjusting screw bolt used for adjusting the fixing plate. A long-narrow slot is provided on the intermediate portion of the fixing plate along the adjusting screw bolt; and a tongue hook is extended from the front end of the intermediate portion of the fixing plate. Whenever standing the supporting legs of the present invention, the U-shaped frame may be parallelly pressed into the bottom of roaster oven body, and then the fixing plate of the fixed device can be moved forward so that the above mentioned tongue hook may engage with the intermediate portion of the U-shaped frame. Further, the adjusting screw can be rotated in clockwise direction to press the fixing plate into the intermediate portion of the U-shaped frame. At this time, the U-shaped frame of the folding means will integratedly combine with the fixing plate, and it will then stabilize the supporting legs of roaster oven.

The object of the present invention is to provide a fixed device of folding leg, in which the U-shaped frame is able to be fixed by means of the fixed device of the present invention when the supporting legs are at a standing position.

The other object of the present invention is to provide a fixed device of folding leg, in which the U-shaped frame of the folding means, while standing, is pressed and fixed by means of the fixing plate of the fixed device which may substantially integrate the roaster oven with the supporting legs thereof so as to stabilize said oven as being unfolded to stand.

For a fuller understanding of the present invention, referrence should now be had to following detailed description thereof taken into conjunction with accompanying drawings in which:

DESCRIPTION OF THE DRAWINGS

FIG. 1 is a perspective view of the fixed device of folding leg of the present invention.

FIG. 2 is a sectional view taken along the line 2—2 of FIG. 1.

FIG. 3 is a front view of the fixed device of the present invention set on a roaster oven as being unfolded to stand.

FIG. 4 is a side view of FIG. 3.

FIG. 5 is a bottom view of roaster oven while folding the supporting legs thereof.

FIG. 6 is a partial perspective view of the supporting legs of roaster oven as being unfolded to stand.

DETAILED DESCRIPTION

As shown in FIG. 1 and FIG. 2, the fixed device 10 of folding leg of the present invention includes a U-shaped fixing base 14 having a double base 12, a U-shaped fixing plate 16 which is able to properly engage with the above said U-shaped fixing base 14 and to arbitrarily slip back and forth, and an adjusting screw bolt 22 equipped on the fixing plate 16 which is used for adjusting the fixing plate 16. The adjusting screw bolt 22 comprises a screw rod 22c penetrating through the intermediate portion 18 of the fixing plate 16, on which is provided a long-narrow slot 24 along the adjusting screw bolt 22, and the intermediate portion 20 of the U-shaped fixing base 14 so as to arbitrarily move the fixing plate 16 back and forth. Also, a tongue hook is extended from the front end of said intermediate portion 18 of the fixing plate 16. Therefore, referring FIG. 3, FIG. 4 and FIG. 6, when the supporting legs are at a standing position, the U-shaped frame 32 of the folding means will parallelly press into the bottom 34 of roaster oven body 50, and then the fixing plate 16 of the fixed device is moved forward along the arrow direction appearing in FIG. 6 which will allow the above mentioned tongue hook 26 engaging with the intermediate portion 36 of the U-shaped frame 32. Furthermore, the adjusting screw bolt 22 is then rotated to a tighter condition so as to tightly press the fixing plate 16 against the intermediate portion 36 of the U-shaped frame 32. As a result of this contruction and operation, it will substantially integrate the U-shaped frame 32 with the fixing plate 16 and also integrate the roaster oven body 50 with the supporting legs 30 thereof. By extending the supporting legs, the roaster oven will have highly stabilized and will not be easily vibrated as being thrusted.

When it is desirous to fold the supporting legs 30 of roaster oven, the adjusting screw bolt 22 can be only rotated in a counter direction to loosen the fixing plate 16 so as to retract the tongue hook 26 provided in the front end of the fixing plate 16 back its origional position from the engaging position with the intermediate portion 36 of the U-shaped frame 32. The supporting legs 30 will be then easily folded onto the bottom of the roaster oven body 50 as shown in FIG. 5.

As shown in FIG. 2, a coil compression spring 38 is provided in the adjusting screw bolt 22 between the fixing plate 16 and the fixing base 14. The coil compression spring 38 is used for compressing against the fixing plate 16 in order to prevent the fixing plate 16, after back to its origional position, from driving forward to its pressed position, resulted from users' carelessness or using more force on the fixing plate 16, which will obstruct the engagement by the fixing plate 16 with the intermediate portion 36 of the fixing frame 32 as next extending for standing.

A groove 22b is also provided on the rotating button 22a of the adjusting screw bolt 22 so that it may use a screw bolt driver, when necessary, to rotate the adjusting screw bolt 22 more tighter.

I claim:

1. A latch mechanism for stabilizing a foldable leg assembly on a roaster oven body comprising:
    (a) a bracket including a U-shaped intermediate member having a bight portion, first and second leg portions extending from said bight portion at two opposite edges thereof, first and second bases extending laterally from said first and second leg portions, respectively, at ends of said first and second leg portions away from said bight portion, and an aperture in said bight portion, said first and second bases being secured to said oven body in assembled condition of said latch mechanism;
    (b) a latch member including a U-shaped portion with a central section having a pair of leg segments extending from two opposite edges thereof, said central section also having a tongue-like extension extending toward the center of said oven from one end thereof, said latch member being disposed in nesting relationship around said bracket wherein the leg segments and central section of said latch member are located in proximity over the leg portions and bight portion, respectively, of said bracket, said central section of said latch member having an elongated narrow slot passing over said aperture in said bight portion;
    (c) means at the free end of said tongue-like extension for hooking against a connecting frame element for a foldable leg assembly of said oven to provide said oven with stability when its legs are extended to supporting position; and
    (d) a threaded adjustment screw bolt passing through said slot in said central section of said latch member and in threaded relationship with said aperture in said bight portion of said bracket to facilitate sliding adjustment of said latch member with respect to said bracket whereby said hooking means at the free end of said tongue-like extension may be placed around said connecting frame element, drawn tightly thereagainst, and securely held to provide stability.

2. A latch mechanism as defined in claim 1 comprising a coil spring extending around said screw bolt and under compression between said bracket and said latch member.

3. A latch mechanism as defined in claim 1 wherein in said screw bolt includes a grooved or slotted head.

* * * * *